W. B. MORTON.
FOLDING CAMERA.
APPLICATION FILED MAR. 7, 1916.

1,293,864.

Patented Feb. 11, 1919.
4 SHEETS—SHEET 1.

Inventor
W. B. Morton

W. B. MORTON.
FOLDING CAMERA.
APPLICATION FILED MAR. 7, 1916.
1,293,864.
Patented Feb. 11, 1919.
4 SHEETS—SHEET 2.
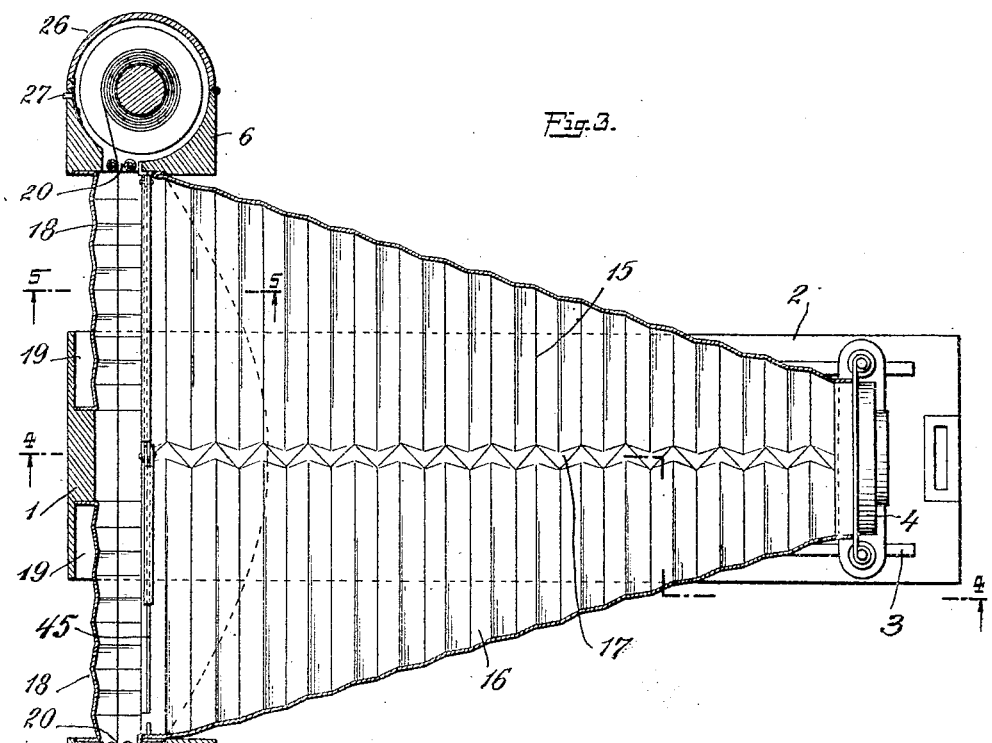
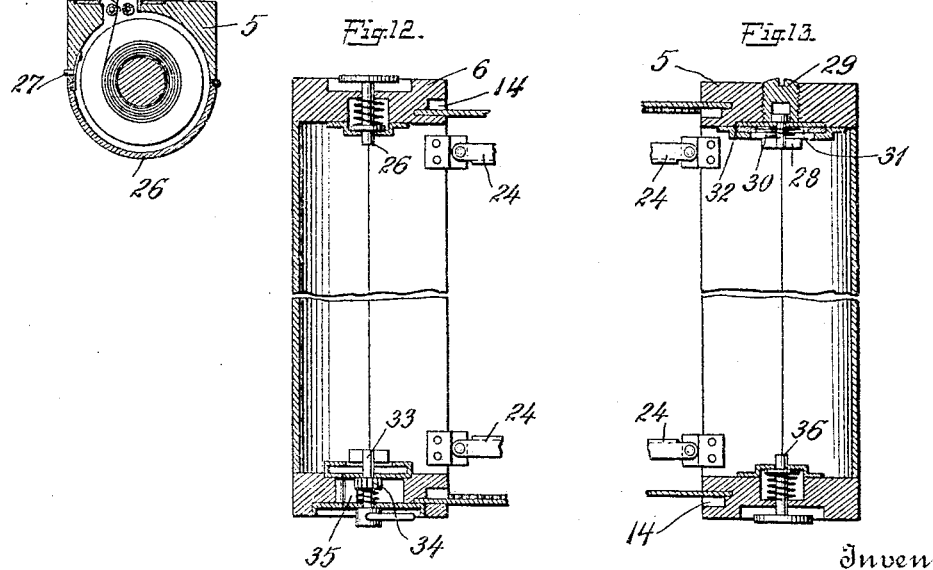
Inventor
W. B. Morton

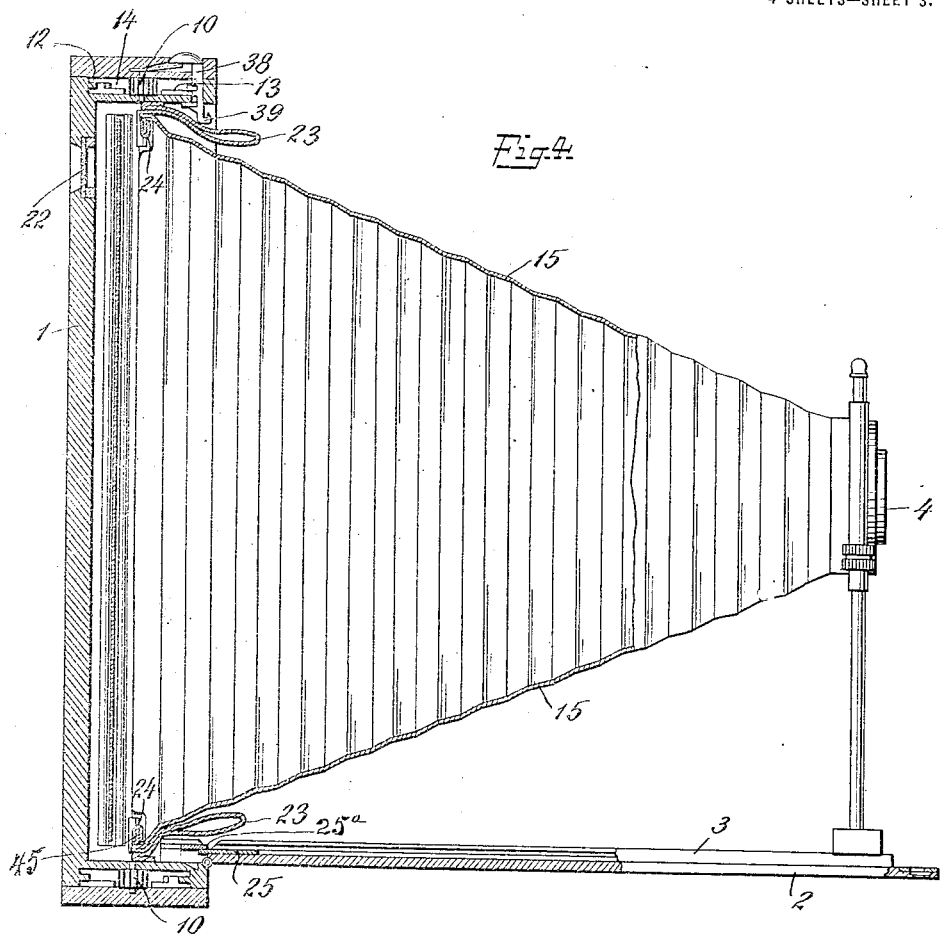
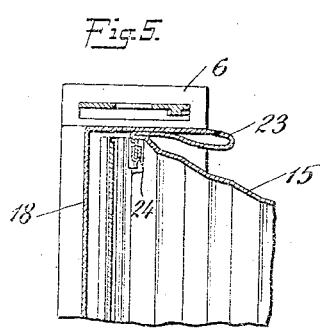
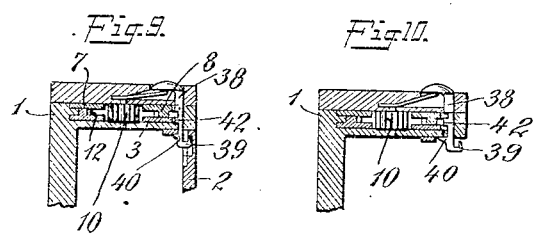
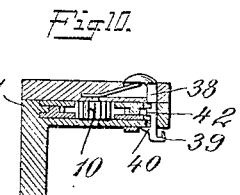

W. B. MORTON.
FOLDING CAMERA.
APPLICATION FILED MAR. 7, 1916.
1,293,864.
Patented Feb. 11, 1919.
4 SHEETS—SHEET 4.
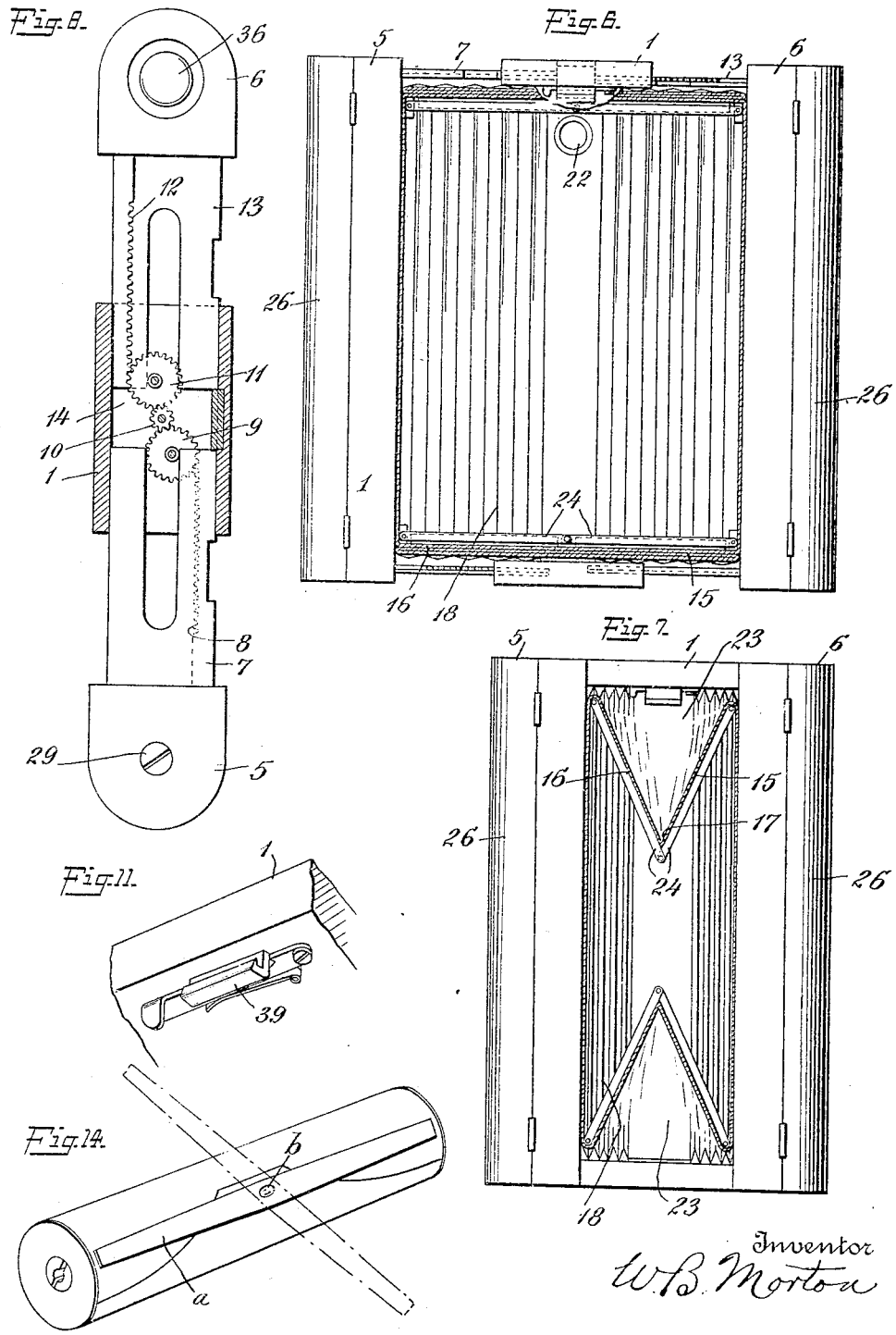
Inventor
W. B. Morton

UNITED STATES PATENT OFFICE.

WOOLRIDGE BROWN MORTON, OF NEW YORK, N. Y.

FOLDING CAMERA.

1,293,864. Specification of Letters Patent. Patented Feb. 11, 1919.

Application filed March 7, 1916. Serial No. 82,549.

*To all whom it may concern:*

Be it known that I, WOOLRIDGE BROWN MORTON, a citizen of the United States, and a resident of the city, county, and State of New York, have invented certain new and useful Improvements in Folding Cameras; and I do hereby declare the following to be a full, clear, and exact description of the invention, such as will enable others skilled in the art to which it appertains to make and use the same.

This invention relates to cameras of the folding type, and has for its object to provide a camera which will take pictures of considerable size in both dimensions, but which will fold to sufficiently small bulk to be carried in the pocket.

Folding cameras as heretofore constructed and now on the market are folding only in the sense that the lens-carrying plate may be adjusted toward and from the plane of the film by means of the connecting bellows, thereby reducing the dimensions of the camera in thickness only, leaving the width and length of the camera necessarily greater than the corresponding dimensions of the picture. Either the width or the length of the camera must be increased by the space for the film rolls at each end so that a camera which folds sufficiently to carry in the pocket can take only a picture of small size at least in one dimension.

The camera of my invention is designed to be folded not only to reduce the thickness of the camera in the usual manner, but also to reduce one of the other dimensions of the camera so that no one face of the folded camera is as large on both dimensions as the picture which it will take. As the extent to which the camera projects out of the pocket does not interfere with its being so carried, and as the other dimension is reduced when the camera is folded, a real pocket camera may be designed to take a picture of quite large size.

A further object of the invention is to provide a camera of this character which when folded will present a continuous rigid case differing in no wise from the appearance of the present familiar type of folding camera.

A further object of the invention is to provide a camera of this type which may be extended and collapsed without difficulty or liability to get out of order, and which, when extended, may be used in exactly the same manner as an ordinary camera.

With the above objects in view my invention consists in the construction illustrated in the accompanying drawings and hereinafter described, in which drawings—

Fig. 3 is a horizontal section through the extended camera;

Fig. 4 is a vertical section on line 4—4 of Fig. 3;

Fig. 5 is a vertical section of a portion of Fig. 3 on line 5—5;

Fig. 6 is a front elevation of the extended camera with the folding front board removed and the bellows shown in section;

Fig. 7 is a similar view of the camera with its parts collapsed;

Fig. 8 is a plan view partly in section of the camera case with the bellows removed;

Figs. 9, 10 and 11 are detail views of the latch for holding the parts in extended or collapsed position;

Figs. 12 and 13 are sectional views through the two film roll compartments, respectively; and Fig. 14 is a perspective view of a film roll designed for use in the camera of my invention.

Figure 1:
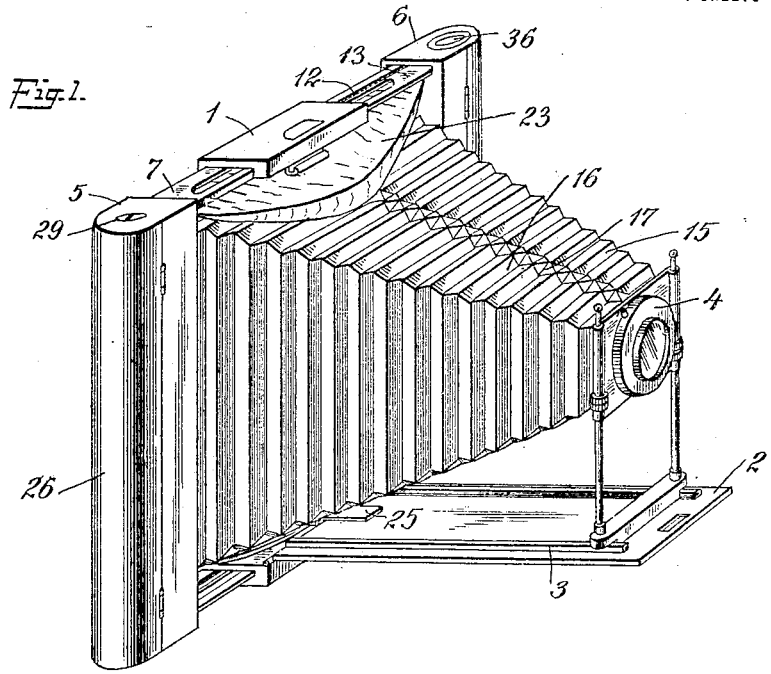
Figure 1 is a perspective view of my improved camera extended for use.

Referring to the drawings, 1 indicates what I term the main portion of the camera case, which consists of a back piece having integral or rigidly attached top and bottom pieces of a width equal to the thickness of the camera when the camera is collapsed. The folding front board 2 is hinged to the front edge of the bottom piece on part 1 in the usual manner, and has on its inner face the guide tracks 3 for the lens carrier 4 which may be of any approved design and is therefore not shown in detail.

Connected to the main part 1 of the case in a manner to be adjusted toward and from such part are the two film roll cases 5 and 6 respectively. The extensible connections between the film roll cases and the part 1 of the camera case may be variously designed to permit the lateral adjustment described, and in the drawings I have shown a preferred form of adjustment or connection which takes up little room and rigidly and positively maintains the several parts in their adjusted position both when extended and collapsed. Such connections are duplicated at the top and bottom of the camera, and a description of one portion only will therefore suffice. Attached to the inner face of the roll holding compartment 5 slightly below the upper edge is a guide plate 7 of a width slightly less than the roll holding compartment. The top piece of the part 1 is formed of two spaced parts connected at the front and rear edges, and the said plate projects through the top piece with its edges working in suitable grooves provided for the purpose, as shown in Figs. 8, 9 and 10. The plate 7 is thicker at one edge than the other, and the inwardly facing edge of the thicker portion is provided with rack teeth 8 meshing with a gear 9 mounted between the spaced walls of the top piece at a point slightly to the front and to one side of the center of the top piece.

The gear 9 meshes with a pinion 10 mounted at the center of the top piece and filling the space between its upper and lower parts. Also meshing with the pinion is a second gear 11 similar to the gear 9 and similarly positioned with respect to the rear edge and farther side of the top piece. The gears 9 and 11 are of a thickness slightly less than one-third of the space between the upper and lower parts of the top piece and are provided with hubs as indicated to maintain them in the same plane in the middle of the space between the spaced walls. Meshing with the gear 11 is a rack 12 formed on the inner face of the thick edge of a plate 13 similar to the plate 7, with the position of its guide rack reversed, as will be clear from Fig. 8. The plate 13 is attached to the inner face of the film compartment 6 sufficiently below the upper edge thereof to lie below the plate 7 in the top piece 1, as will be clear from the drawings. The plates 7 and 13 are cut away at their middle portions to clear the pinion 10 and the spindles of the gears 9 and 11. The plates 7 and 13 are such that when the camera is extended by drawing the film compartment away from the middle portion 1 the ends of the plates are spaced apart a distance somewhat less than the distance between the centers of the gears 9 and 11, and when the camera is collapsed the ends of the plates 7 and 13 project slightly into the upper walls of the adjacent film compartments, suitable recesses 14 being provided for the purpose, as indicated in Figs. 12 and 13.

In order to permit the extension of the camera in the manner described and at the same time provide a light-tight compartment between the two film compartments and also between the film and the lens carrier, I have provided a bellows of novel and unique design which I will now describe.

Figure 2:
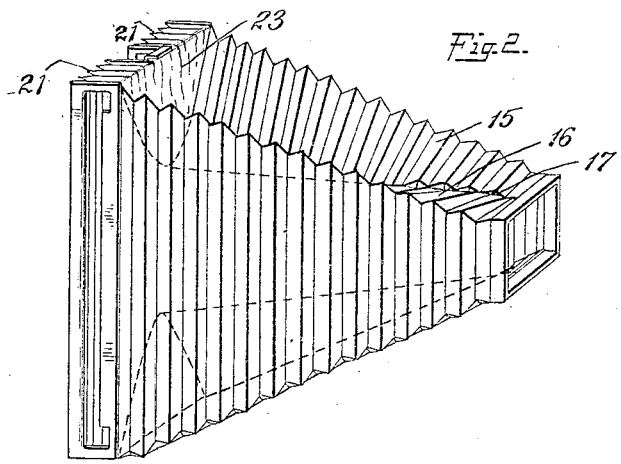
Fig. 2 is a perspective view of the bellows only of the camera in the position it assumes when the camera is collapsed in one direction but before the lens plate is pushed back.

This bellows is shown in perspective in Figs. 1 and 2 in extended and partially collapsed condition, and comprises a front part similar in general design to the usual form of bellows but having its upper and lower walls 15 and 16 provided with a central longitudinal fold 17 opposite to the corner folds of the bellows, that is, the external angle of the fold is on the inside of the camera instead of on the outside. In order to permit the bellows to be folded along the line of this fold, and also to collapse in the usual manner, the bellows folds of the sides of the walls 15 and 16 on the opposite sides of the fold 17 have their corrugations staggered, that is, the external angles of the corrugations on one side of the longitudinal fold are in line with the internal angles of the corrugations on the opposite side of the fold. The bellows comprises in addition to the front part just described, two rear walls 18 lying on each side of the middle part 1, and provided with vertical folds to extensibly connect the film compartments with the middle part 1, the two walls 18 having vertical folds as indicated more particularly in Figs. 3 and 6. The back wall of the middle part 1 is reduced in thickness at each edge as shown in Fig. 3, to provide pockets 19 to receive the folded walls 18 when the camera is collapsed so that the face of the film compartments may come into contact with the edges of the back wall. The walls 18 are connected to the faces of the film compartments to the rear of the openings 20 through which the film extends, and the edges of the side walls of the front part of the bellows are connected to the faces of the film compartments in front of the openings 20. To form a light-tight closure at the top and bottom of the camera between the rear walls 18 and front portion of the bellows, the bellows is formed with upper and lower walls 21 forming a continuation of the rear walls 18 at right angles thereto, and with the bellows folds of the rear walls extending to a point adjacent the rear edge of the front portion of the bellows. The rear edge of the walls 21 are cut away in the middle to conform with the walls 18 but across the front are formed in a continuous piece, the edges of the cut-away portion being attached to the under face of the top and bottom pieces of the part 1, along the line with the edges of the walls 18 so that the middle portion of the part 1 forms part of the light-tight compartment of the camera, whereby a rigid part is provided for receiving the red glass window 22 through which the number of the film may be observed.

The front edges of the walls 21 are not connected along a straight line to the adjacent edges of the walls 15 and 16 for the reason that when the camera is laterally collapsed, the middle portions of the walls 15 and 16 are drawn inwardly along the fold 17 as indicated in Fig. 2, thereby necessitating a certain amount of slack between the walls 21 of the rear portion of the bellows and the corresponding walls of the front portion. The slack is provided in the form of a substantially triangular piece 23 of flexible leather or other suitable material which may be formed as an extension of the corresponding wall 21 beyond the ends of the bellows folds. The edges of the triangular piece on each side of the apex of the front angle are connected to the adjacent edges of the walls 15 and 16 on each side of the longitudinal folds forming in effect a continuation of the walls which may be integral therewith. In the drawings the entire bellows is shown as formed of a single continuous piece, but obviously, for convenience of manufacture, its various portions will be formed of separate pieces.

For guiding the edges where the triangular portions join the walls 15 and 16 when the bellows is collapsed I preferably provide hinged toggle links 24 pivoted to the faces of the film compartments at the corners of the front portion of the bellows and with their connecting pivots in line with the folds 17 of the upper and lower wall. The links 24 are formed of U-shaped pieces adapted to be crimped into engagement with narrow tongues 45 of the bellows fabric projecting inwardly from the bellows along the line of the junction of walls 15, 16 and 23. The metal of the links 24 and their pivotal connections with the film compartments will be sufficiently strong to maintain their plane of movement parallel with the plane of the film so that the bellows folds of the front portion of the camera will be maintained parallel to permit its being collapsed when the lens-carrier is pushed into the case.

The film holding compartments are of sufficient size to hold a spool of film and are formed with their upper and lower ends fixed to the inner walls and with their outer walls curved as shown, to provide doors 26 through which the film is placed in the camera. The doors will form a light-tight closure and will be provided with suitable catches, as indicated at 27. In order to permit the inner compartments to be adjusted toward and from each other as described, and at the same time preserve the proper position of the film in the camera, I provide the film compartment 5 with a "re-wind" mechanism which takes up the film when the film compartments are adjusted toward each other. This mechanism is shown in Fig. 13 and comprises a spindle 28 having the usual spool engaging key and mounted for free rotation and vertical play in a plug 29 screwed into the top wall of the film compartment. The spindle 28 has attached to it one end of a coiled spring 30, the other end of which is connected to a friction disk 31 held by the plug 29 in frictional engagement with a flanged ring 32 attached to the inner face of the upper wall of the film compartment. The length of the spring 30 is sufficient to permit the spindle to turn against the tension of the spring without turning the disk 31 during the adjustment of the film compartments away from each other whereby when the film compartments are again pushed together the spring will unwind, turning the spindle 28 and the connected film spool rewinding the film spool in that compartment. To prevent the pull of the spring unwinding the film from the other spool and thereby disturbing the spacing of the exposures, the film compartment 6 is provided with the usual winding spindle 33 by means of which the film is changed for exposure, this spindle being provided with a ratchet 34 which is held by a suitable pawl 35 against rotation except in a direction to wind the film on the spool. The opposite ends of the compartments 5 and 6 are provided with the usual centering spindles 36 and all the spindles 28, 33 and 36 are mounted for slight vertical movement against the tension of their respective springs to permit the spools to be inserted between the spindles. When the film is shifted for a fresh exposure by turning the spindle 33 the pull of the film on the spool in the compartment 6 first winds the spring 30 until its tension overcomes the friction between the disk 31 and the ring 32. Friction between the parts may be regulated by the screw 29 so as to always maintain the spring under sufficient tension to wind up the film when the camera is folded.

To hold the front board in horizontal position when the camera is opened there is provided a bar 25 at the lower edge of the front board, which catches under a loop 25ª attached to the inner face of the bottom piece of the part 1 as shown in Fig. 4, or obviously, other means may be provided for the purpose. In order to hold the film compartments in open and closed positions, and also in order to hold the front board closed when the camera is completely folded, I provide a single catch, shown particularly in Figs. 8, 9, and 10. This catch comprises a hook-shaped bar 38 having a button head mounted in a recess in the upper face of the top plate of the top piece and spring-held in its most elevated position. The bar 38 is provided at its lower end which projects beneath the top piece with a hook 39 adapted to engage a socket formed in the end of the front board, and also with a rearwardly projecting lug 40 which coöperates with a supplemental latch 41 shown in detail in Fig. 11, which operates to hold the bar 38 in an intermediate position against the tension of its spring. The bar 38 is of a width equal to the distance between the ends of the plates 7 and 13, and on its rear edge is cut away to form an intermediate lug 42 between the lug 40 and the upper part of the bar. The bar 38 is positioned in the top piece so that the lug 42 intersects guide grooves of the plates 7 and 13, and the lug 42 is of a width to lie between the edges of the plates when adjusted to its uppermost position as indicated at Fig. 10, with the lug 40 engaging the under face of the top part of the case.

In operation, assuming the camera closed as in Fig. 9, the button is pressed to release the front board which is dropped to horizontal position and the bellows extended on the front board before the film compartments are adjusted to open position. When the button is released after releasing the front board, the lug 40 catches against the catch 41, in which position the lug 42 and the upper part of the bar 38 lie in the notches in the plates 7 and 13, as shown in Fig. 8. The catch 41 is then released allowing the spring of the bar 38 to raise the bar until the lug 40 engages the under side of the upper plate so that the lug 42 lies between the plates, and the upper part of the bar is above the upper plate. The film compartment may then be drawn out, their geared connection insuring that they move equally so that the center fold 17 of the bellows is maintained in the middle and distortion of the bellows is prevented.

When the film compartments are fully extended, as determined by the toggle links 24, the button is again pressed down until the lug 40 catches on to the latch 41, in which position the lug 42 and the head of the bar 38 lie between the ends of the plates 7 and 13, holding the camera in its fully extended position. As the film compartments are extended the toggle links raise and lower the middle limp triangular portions 23 of the bellows so that they extend in loops above and below the upper and lower walls respectively of the front portion of the bellows. While the film compartments are being drawn apart the film winds up the spring 30, or if the spring is fully wound, turns the friction disk with the spindle so that when the camera is folded after taking a picture, the spring will wind up the film on the roller from which it was pulled off, thereby not interfering with the spacing of the exposures on the film, which are determined by the extent of movement of the winding spindle 33.

The construction of the extensible plates, gears, etc., at the top of the camera is duplicated at the bottom, except that the latch is omitted, a single latch being sufficient, as the plates 7 and 13 maintain the several parts in parallel.

In order that the numbers on the film will remain opposite the window 22 in both extended and closed position of the camera, the window may be positioned in the door of one of the film compartments and the numbers correspondingly placed on the film.

To thread the camera, both film compartments are opened and the camera is collapsed to bring the openings 20 as near together as possible. The end of the paper is then unwound sufficiently to be projected through the opening 20 of one compartment across the width of the casing part 1, and through the other opening, where it may be grasped and connected to the receiving spool in the usual manner. To facilitate the threading of the camera in this manner, I may provide the film roll with a tongue of stiff paper, as shown in Fig. 14 at $a$, which is attached to the end of the paper of the film roll by means of an eyelet B so that the tongue may be turned at right angles to the axis of the roll to facilitate threading the end of the paper across the space between the roll compartments. When the end of the paper is grasped by the fingers, the tongue is torn off and discarded.

I have shown and described the preferred construction of my improved camera, but it is to be understood that the invention is not limited to the details of construction shown, as so far as I am aware, I am the first to provide a camera of this type which is extensible in more than one direction, and my invention is therefore to be understood as including all variations and modifications of the construction shown as fall within the scope of the appended claims.

I claim:

1. A camera comprising relatively adjustable parts forming a substantially continuous casing when closed and extensible in more than one direction, when opened, and light-tight connections between said parts forming an inclosure for a member having a photographically sensitive surface.

2. In a camera the combination of relatively adjustable parts forming a substantially continuous casing when closed and extensible in more than one direction, a bellows connected to said casing parts, a lens carrier at one end of said bellows and adjustable toward and from said casing parts, extensible material between said casing parts and forming with said bellows a light-tight inclosure for a member having a photographically sensitized surface.

3. In a camera the combination of a casing comprising relatively movable parts, a lens carrier adjustable relatively to said casing parts, and a bellows connecting said lens carrier and said casing parts, and creased to be extensible in two directions.

4. In a camera the combination of a casing comprising relatively movable parts, a lens carrier adjustable relatively to said casing parts, and a bellows connecting said lens carrier and said casing parts, said bellows having creases transverse to its bellows folds on opposite faces to permit extension in two directions.

5. In a camera the combination of a casing having a middle part, a folding front board attached to its middle part, separate film roll compartments, adjustable connections between said film roll compartments and said middle part, a lens carrier mounted for adjustment toward and away from said middle part on said folding front board, a bellows structure connecting said lens carrier, said film compartments and said middle frame part to form a light-tight compartment.

6. In a camera the combination of a casing having a middle part, a folding front board attached to said middle part, separate film roll compartments, adjustable connections between said film roll compartments and said middle part, a lens carrier mounted for adjustment toward and away from said middle part on said folding front board, a bellows structure connecting said lens carrier, said film compartments and said middle frame part to form a light-tight compartment, said film compartments being arranged to maintain a connecting web of film in a plane perpendicular to the optical axis of the camera, and means for maintaining the connecting strip of film taut when the film compartments are adjusted toward and from the middle film portion.

7. In a camera a folding casing comprising a middle part having a folding front board, film compartments, and adjustable connections between said film compartments and said middle part, said film compartments being shaped to form a substantially continuous case with said middle part and said folding front board when adjusted into engagement with such parts.

8. In a camera a folding casing comprising a middle part having a folding front board, film compartments adjustably connected to said middle part and shaped to form a substantially continuous case with said middle part and said folding front board when adjusted into engagement with such parts, and connections between said film compartments and said middle casing part for causing said film compartments to be equally and oppositely adjusted relative to said middle part when the camera is to be extended.

9. In a camera a folding casing comprising a middle part having a folding front board, film compartments adjustably connected to said middle part and shaped to form a substantially continuous case with said middle part and said folding front board when adjusted into engagement with such parts, a lens carrier adjustably mounted on said front board and a bellows connecting said lens carrier and said two film compartments, and flexible material connecting the rear portions of said film compartments and said middle casing part, said material being connected to the walls of the bellows between the film compartments to form a light-tight compartment extensible in the direction opposite to the line of extension of said bellows.

10. A bellows structure for cameras comprising a bellows folded portion of the usual pyramid form having longitudinal folds in two opposite faces to permit the bellows to be folded in a direction transverse to the usual line of extension of the bellows.

11. A bellows structure for cameras comprising a bellows folded portion of the usual pyramid form having longitudinal folds in two opposite faces to permit the bellows to be folded in a direction transverse to the usual line of extension of the bellows, the folds in said faces having their external angle facing the interior of the bellows.

12. A bellows structure for cameras comprising a bellows folded portion of the usual pyramid form having longitudinal folds in two opposite faces to permit the bellows to be folded in a direction transverse to the usual line of extension of the bellows, and an extensible back portion comprising a creased wall transverse to the line of extension of said bellows portion, and intermediate flexible material connecting the edges of the back portion to the edges of the bellows portion.

13. In a camera the combination of a casing having a middle part, a folding front board attached to said middle part, separate film roll compartments, adjustable connections between said film roll compartments and said middle part, and a single latch adapted to hold said front board casing part and film compartments closed together to form a substantially continuous casing.

Signed at New York city, in the county of New York and State of New York, this sixth day of March, 1916.

WOOLRIDGE BROWN MORTON.